United States Patent
Xie (10) Patent No.: US 11,668,590 B2
(45) Date of Patent: Jun. 6, 2023

(54) SYSTEM AND METHOD FOR FIBER SENSING

(71) Applicant: Alibaba Group Holding Limited, Grand Cayman (KY)

(72) Inventor: Chongjin Xie, Morganville, NJ (US)

(73) Assignee: Alibaba Group Holding Limited, George Town (KY)

( * ) Notice: Subject to any disclaimer, the term of this patent is extended or adjusted under 35 U.S.C. 154(b) by 192 days.

(21) Appl. No.: 17/095,557

(22) Filed: Nov. 11, 2020

(65) Prior Publication Data

US 2022/0146287 A1     May 12, 2022

(51) Int. Cl.

| | |
|---|---|
| *G01D 5/34* | (2006.01) |
| *H04B 10/25* | (2013.01) |
| *H04B 10/60* | (2013.01) |
| *H04B 10/50* | (2013.01) |
| *H04B 10/077* | (2013.01) |
| *H04B 10/27* | (2013.01) |

(52) U.S. Cl.
CPC ........... *G01D 5/344* (2013.01); *H04B 10/077* (2013.01); *H04B 10/25* (2013.01); *H04B 10/27* (2013.01); *H04B 10/50* (2013.01); *H04B 10/60* (2013.01)

(58) Field of Classification Search
None
See application file for complete search history.

(56) References Cited

U.S. PATENT DOCUMENTS

| | | | |
|---|---|---|---|
| 5,305,412 A | 4/1994 | Paoli | |
| 6,016,219 A | 1/2000 | Fatehi | |
| 6,175,560 B1 | 1/2001 | Bhagalia et al. | |
| 6,266,168 B1 | 7/2001 | Denkin | |
| 6,341,032 B1 | 1/2002 | Fukashiro | |
| 6,433,922 B1 | 8/2002 | Ghera | |
| 6,650,468 B1 | 11/2003 | Bryant | |
| 6,690,884 B1 * | 2/2004 | Kelty | H04B 10/695 |
| | | | 714/704 |
| 6,754,420 B2 | 6/2004 | Tsuritani | |
| 6,952,395 B1 | 10/2005 | Manoharan | |
| 7,024,110 B2 | 4/2006 | Jasti | |
| 7,123,404 B1 | 10/2006 | Mori | |
| 7,136,583 B2 | 11/2006 | Oberg | |
| 7,231,146 B2 | 6/2007 | Arecco | |

(Continued)

FOREIGN PATENT DOCUMENTS

WO    2015128476    9/2015

*Primary Examiner* — Darren E Wolf (74) *Attorney, Agent, or Firm* — Shun Yao; Yao Legal Services, Inc.

(57) ABSTRACT

One embodiment described herein provides a system for distributed fiber sensing. The system can include a plurality of network elements (NEs) in an optical transport network (OTN) and a control-and-management module coupled to the NEs. A respective network element (NE) can include a first wavelength coupler configured to separate an optical supervisory channel (OSC) signal from a data-carrying signal received from a fiber span, a polarization-measurement unit configured to perform a polarization measurement on the OSC signal, and a transmitter configured to transmit an outcome of the polarization measurement to the control-and-management module, thereby facilitating distributed fiber sensing based on the outcome of the polarization measurement.

19 Claims, 7 Drawing Sheets

(56) References Cited

U.S. PATENT DOCUMENTS

| | | |
|---|---|---|
| 7,400,829 B2 | 7/2008 | Watanabe |
| 7,756,422 B2 | 7/2010 | Sakamoto |
| 8,822,895 B2 | 9/2014 | Abedin |
| 9,712,239 B2 | 7/2017 | Murshid |
| 9,787,418 B2 | 10/2017 | Earl |
| 9,917,672 B2 | 3/2018 | Jensen |
| 10,230,464 B2 | 3/2019 | Yuan |
| 10,320,691 B1 | 6/2019 | Matthews |
| 11,336,376 B1 | 5/2022 | Xie |
| 2001/0021045 A1 | 9/2001 | Tervonen |
| 2002/0154353 A1 | 10/2002 | Heath |
| 2002/0191904 A1 | 12/2002 | Kani |
| 2003/0215231 A1* | 11/2003 | Weston-Dawkes ......... H04J 14/0238 398/19 |
| 2004/0037555 A1 | 2/2004 | Evangelides |
| 2004/0047371 A1 | 3/2004 | Lentine |
| 2004/0090662 A1 | 5/2004 | Bang |
| 2004/0114925 A1 | 6/2004 | Berthold |
| 2004/0146305 A1 | 7/2004 | Neubelt |
| 2004/0175187 A1 | 9/2004 | Eiselt |
| 2004/0208506 A1 | 10/2004 | Kinoshita |
| 2004/0213577 A1 | 10/2004 | Sugahara |
| 2005/0025486 A1 | 2/2005 | Zhong |
| 2005/0047781 A1 | 3/2005 | El-Reedy |
| 2005/0074236 A1 | 4/2005 | Urimindi |
| 2005/0078601 A1 | 4/2005 | Moll |
| 2005/0078959 A1* | 4/2005 | Shin ............... H04J 14/0241 398/45 |
| 2005/0110980 A1 | 5/2005 | Maehara |
| 2006/0067346 A1 | 3/2006 | Tucker |
| 2006/0087975 A1 | 4/2006 | Zheng |
| 2006/0115266 A1 | 6/2006 | Levi |
| 2006/0165079 A1 | 7/2006 | Rodrigo |
| 2006/0176545 A1 | 8/2006 | Nakamura |
| 2008/0008183 A1 | 1/2008 | Takagaki |
| 2009/0028562 A1 | 1/2009 | Gianordoli |
| 2009/0067843 A1 | 3/2009 | Way |
| 2009/0103915 A1 | 4/2009 | Aprile |
| 2009/0169212 A1* | 7/2009 | Onaka ............. H04J 14/0221 398/79 |
| 2009/0226174 A1 | 9/2009 | Csupor |
| 2009/0245786 A1 | 10/2009 | Sakamoto |
| 2009/0262790 A1 | 10/2009 | Molotchko |
| 2009/0290837 A1 | 11/2009 | Chen |
| 2010/0091355 A1 | 4/2010 | Ota |
| 2010/0124421 A1 | 5/2010 | Chand |
| 2010/0284687 A1 | 11/2010 | Tanzi |
| 2010/0290780 A1 | 11/2010 | Teipen |
| 2010/0296808 A1 | 11/2010 | Hinderthuer |
| 2011/0116786 A1 | 5/2011 | Wellbrock |
| 2011/0126005 A1 | 5/2011 | Carpenter |
| 2011/0274435 A1 | 11/2011 | Fini |
| 2012/0020672 A1 | 1/2012 | Aguren |
| 2012/0033966 A1 | 2/2012 | Rosenbluth |
| 2012/0078708 A1 | 3/2012 | Taylor |
| 2012/0106971 A1 | 5/2012 | Sugaya |
| 2012/0281950 A1 | 11/2012 | Fattal |
| 2012/0294604 A1 | 11/2012 | Roberts |
| 2013/0189856 A1 | 7/2013 | Ko |
| 2013/0223484 A1 | 8/2013 | Tang |
| 2013/0236175 A1 | 9/2013 | Sethumadhavan |
| 2013/0243438 A1 | 9/2013 | Tang |
| 2013/0272694 A1 | 10/2013 | Sandstrom |
| 2013/0343757 A1 | 12/2013 | Wigley |
| 2014/0013402 A1 | 1/2014 | Bugenhagen |
| 2014/0029941 A1 | 1/2014 | Bratkovski |
| 2014/0105592 A1 | 4/2014 | Kataria |
| 2014/0153922 A1 | 6/2014 | Ryf |
| 2014/0186021 A1 | 7/2014 | Striegler |
| 2014/0199065 A1 | 7/2014 | Bratkovski |
| 2014/0205286 A1 | 7/2014 | Ji |
| 2014/0248059 A1 | 9/2014 | Tang |
| 2014/0258772 A1 | 9/2014 | Kataria |
| 2014/0286648 A1 | 9/2014 | Buelow |
| 2014/0307304 A1 | 10/2014 | Zhu |
| 2014/0363171 A1 | 12/2014 | Tang |
| 2015/0249501 A1 | 9/2015 | Nagarajan |
| 2015/0296279 A1 | 10/2015 | Bouda |
| 2015/0341123 A1 | 11/2015 | Nagarajan |
| 2015/0382088 A1 | 12/2015 | Braun |
| 2016/0056889 A1 | 2/2016 | Le Taillandier De Gabory |
| 2016/0123837 A1* | 5/2016 | Chen ............... G01M 11/3172 356/73.1 |
| 2016/0233959 A1 | 8/2016 | Murshid |
| 2016/0277101 A1 | 9/2016 | Jiang |
| 2016/0306115 A1 | 10/2016 | Koonen |
| 2017/0155466 A1 | 6/2017 | Zhou |
| 2017/0192182 A1 | 7/2017 | Peterson |
| 2017/0214463 A1 | 7/2017 | Milione |
| 2017/0299900 A1 | 10/2017 | Montoya |
| 2017/0343750 A1 | 11/2017 | Ashrafi |
| 2017/0353242 A1 | 12/2017 | Mansouri Rad |
| 2017/0353265 A1 | 12/2017 | Mansouri Rad |
| 2018/0331760 A1* | 11/2018 | Winzer ............. H04B 10/077 |
| 2022/0187559 A1 | 6/2022 | Lin |

* cited by examiner

SYSTEM AND METHOD FOR FIBER SENSING

BACKGROUND

Field

This disclosure is generally related to fiber sensing. More specifically, this disclosure is related to a system and method that implements fiber sensing using existing optical transport networks (OTNs).

Related Art

The invention of the laser and the rapid development of fiber optic technologies have revolutionized the telecommunication industry. Most digital data transmitted are carried by optical fibers, forming an ever-growing national and international communication infrastructure. For example, 99% of all transoceanic data traffic (which can include Internet data, phone calls, and text messages) goes through undersea optical cables. On land, service providers continuously expand their existing fiber network, connecting large cities as well as rural regions. The extensive reach of the optical fibers inspires additional applications, such as fiber sensing.

One approach for fiber optic sensing works by measuring changes in the "backscattering" of light occurring in an optical fiber when the fiber encounters vibration, stress, or temperature change. This technology is not yet mature and has not been implemented in existing fiber networks. Another approach uses the state of polarization (SOP) information of optical signals carried by optical fibers to detect changes in the environment (e.g., mechanical disturbances along the fibers). Although it has been demonstrated that SOP data obtained from subsea cables can be used to detect earthquakes, the SOP information extracted at the end of the long cable provides very low spatial resolution.

SUMMARY

One embodiment described herein provides a network element (NE). The NE can include a first wavelength coupler configured to separate an optical supervisory channel (OSC) signal from a data-carrying signal received from a fiber span, a polarization-measurement unit configured to perform a polarization measurement on the OSC signal, and a transmitter configured to transmit an outcome of the polarization measurement to a control-and-management module, thereby facilitating distributed fiber sensing based on the outcome of the polarization measurement.

In a variation on this embodiment, the polarization-measurement unit comprises a polarimeter configured to measure a state of polarization of the OSC signal.

In a variation on this embodiment, the polarization measurement comprises a measurement of changes in the state of polarization of the OSC signal, and the polarization-measurement unit comprises a linear polarizer followed by a photodetector.

In a variation on this embodiment, the NE can further include an OSC module configured to generate a second OSC signal that includes the outcome of the polarization measurement and a second wavelength coupler configured to combine the second OSC signal and an outgoing data-carrying signal such that the second OSC signal is transmitted to a next NE in an optical transport network (OTN).

In a variation on this embodiment, the NE is an inline NE coupled to two fiber spans, and the inline NE comprises two polarization-measurement units, with each polarization-measurement unit configured to perform a polarization measurement on an OSC signal received from a particular fiber span.

One embodiment described herein provides a system for distributed fiber sensing. The system can include a plurality of network elements (NEs) in an optical transport network (OTN) and a control-and-management module coupled to the NEs. A respective network element (NE) can include a first wavelength coupler configured to separate an optical supervisory channel (OSC) signal from a data-carrying signal received from a fiber span, a polarization-measurement unit configured to perform a polarization measurement on the OSC signal, and a transmitter configured to transmit an outcome of the polarization measurement to the control-and-management module, thereby facilitating distributed fiber sensing based on the outcome of the polarization measurement.

In a variation on this embodiment, the polarization-measurement unit can include a polarimeter configured to measure a state of polarization of the OSC signal.

In a variation on this embodiment, the polarization measurement comprises a measurement of changes in the state of polarization of the OSC signal, and the polarization-measurement unit comprises a linear polarizer followed by a photodetector.

In a variation on this embodiment, the respective NE can further include an OSC module configured to generate a second OSC signal that includes the outcome of the polarization measurement and a second wavelength coupler configured to combine the second OSC signal and an outgoing data-carrying signal such that the second OSC signal is transmitted to a next NE in the OTN.

In a variation on this embodiment, the respective NE is an inline NE coupled to two fiber spans, and the inline NE can include two polarization-measurement units, with each polarization-measurement unit configured to perform a polarization measurement on an OSC signal received from a particular fiber span.

In a variation on this embodiment, the control-and-management module can include a polarization-data-processing unit configured to process the outcome of the polarization measurement included in the updated OSC signal.

In a variation on this embodiment, the control-and-management module can include an environmental-factor-determination module configured to determine environmental factors surrounding the fiber span based on the processed outcome of the polarization measurement.

In a further variation, the environmental factors can include one or more of: mechanical disturbance and temperature changes.

In a further variation, the control-and-management module can include an overlapping-route-determination module configured to determine whether the fiber span shares a route with a corresponding backup fiber.

BRIEF DESCRIPTION OF THE FIGURES

In the figures, like reference numerals refer to the same figure elements.

DETAILED DESCRIPTION

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present invention is not limited to the embodiments shown, but is to be accorded the widest scope consistent with the principles and features disclosed herein.

Overview

In this disclosure, methods and systems are presented for establishing a distributed fiber-sensing network using an existing optical transport network (OTN). Each fiber span in the optical fiber communication network can become a distributed fiber sensor that measures environmental factors (e.g., vibrations and changes in temperature) continuously along the length of the fiber span. More specifically, such measurements can be achieved by monitoring the state of polarization (SOP) of optical supervisory channel (OSC) signals traversing the OTN. The wavelengths of the OSC signals are out of the fiber communication and amplification bands. To enable the SOP-based fiber sensing, an SOP-monitoring device can be embedded in each network element (NE) to monitor the SOP of the OSC signals in a fiber span or fiber spans adjacent to the NE. The SOP information can be reported to a control-and-management module of the fiber-sensing network. The control-and-management module can include an SOP-data-processing unit configured to process the SOP information in order to obtain environmental information along the fiber paths.

Distributed Fiber-Sensing Network

Compared to conventional electronic sensors, optical fiber sensors provide many benefits, such as being immune to electromagnetic interference (EMI), nonconductive, electrically passive, low loss, high bandwidth, small, lightweight, relatively low cost, and so on. The use of regular or specially designed optical fibers as sensors to detect changes in temperature and stress levels has been implemented in many applications, such as in infrastructure (buildings, pipelines, bridges, dams, etc.) monitoring. The infrastructure-monitoring techniques often require optical fibers to be embedded within or laid beside the monitored infrastructure. On the other hand, there exist extensive networks of optical fibers buried underground, on land or in the sea. Such fibers can also serve as sensors that can provide information regarding their environment. For example, researchers have attempted to use optical fibers buried along the highway or railroad as sensors to provide traffic information or use subsea optical cables as sensors to detect earthquakes.

Various properties of the light propagating along an optical fiber can be affected by the surrounding environment. Hence, by detecting changes in these properties, one can obtain useful information regarding the environment. One of the properties that may be affected by environmental factors is the state of polarization (SOP). Due to the photoelastic effect, the refractive index of the optical fiber changes when exposed to stress. In many cases, stress applied to the fiber can be different in different directions, thus resulting in different changes in the refractive index in different directions and causing rotations of the polarization. Therefore, by tracking the SOP of light propagating in the fiber, one may infer information associated with external mechanical disturbances to the fiber. Information regarding mechanical disturbances on fibers can indicate traffic patterns on the highway/railroad or seismic activities.

In conventional data communication networks built on optical fibers, data are carried by the fibers as pulses of light traveling at roughly 204,190 kilometers per second. The pulsing light may encounter distortions as it travels across the fibers in the network. At the receiving end, the light pulses are detected, and the distortions are corrected by digital signal processing. To facilitate correction of the distortions, various properties of the light are tracked as part of the optical transmission. One of the tracked properties is the SOP. More specifically, when the data-carrying light pulses are received, the SOP of the optical signal is detected. The SOP information can be useful in many ways, including in determining possible mechanical disturbance (e.g., stress) applied to the optical fibers. However, extracting the SOP information at the end of a long fiber link (e.g., a subsea cable that is over ten thousand kilometers long) can only provide the overall effect of mechanical disturbances along the entire length of the long fiber link; it can be impossible to determine, at a reasonable spatial resolution, the locations where the mechanical disturbances occur.

To increase the spatial resolution of the SOP-based fiber sensing, in some embodiments, the SOP of optical signals in the optical supervisory channel (OSC) is measured and reported at the end of each fiber span (e.g., at each NE within an OTN). The OSC refers to the additional wavelength channels used for network management purposes. OSCs are outside the typical erbium-doped fiber amplifier (EDFA) amplification bands (e.g., C-band and L-band). For example, an OSC wavelength can be 1510 nm (which is shorter than C-band wavelengths) or 1620 nm (which is longer than L-band wavelengths). In additional to carrying user network management information, the OSC can also carry information about the data-carrying optical signals as well as information regarding the conditions of the NEs. Unlike the C-band or L-band data-carrying wavelength, the OSC is always terminated at intermediate amplifier sites (e.g., inline amplifiers), where it receives local information before retransmission.

Using the SOP of the OSC signals for fiber-sensing purposes can have the advantage of not needing additional test signals, because OSC signals are part of the normal optical transmission. Moreover, because the OSC terminates at each amplifier site, the SOP of the OSC signal in one fiber span is independent of the SOP of the OSC signal in another fiber span. Consequently, the SOP of the OSC signal in one particular fiber span can provide information regarding mechanical disturbances (e.g., stress) to that particular fiber, thus significantly increasing the spatial resolution of fiber sensing.

Figure 1:
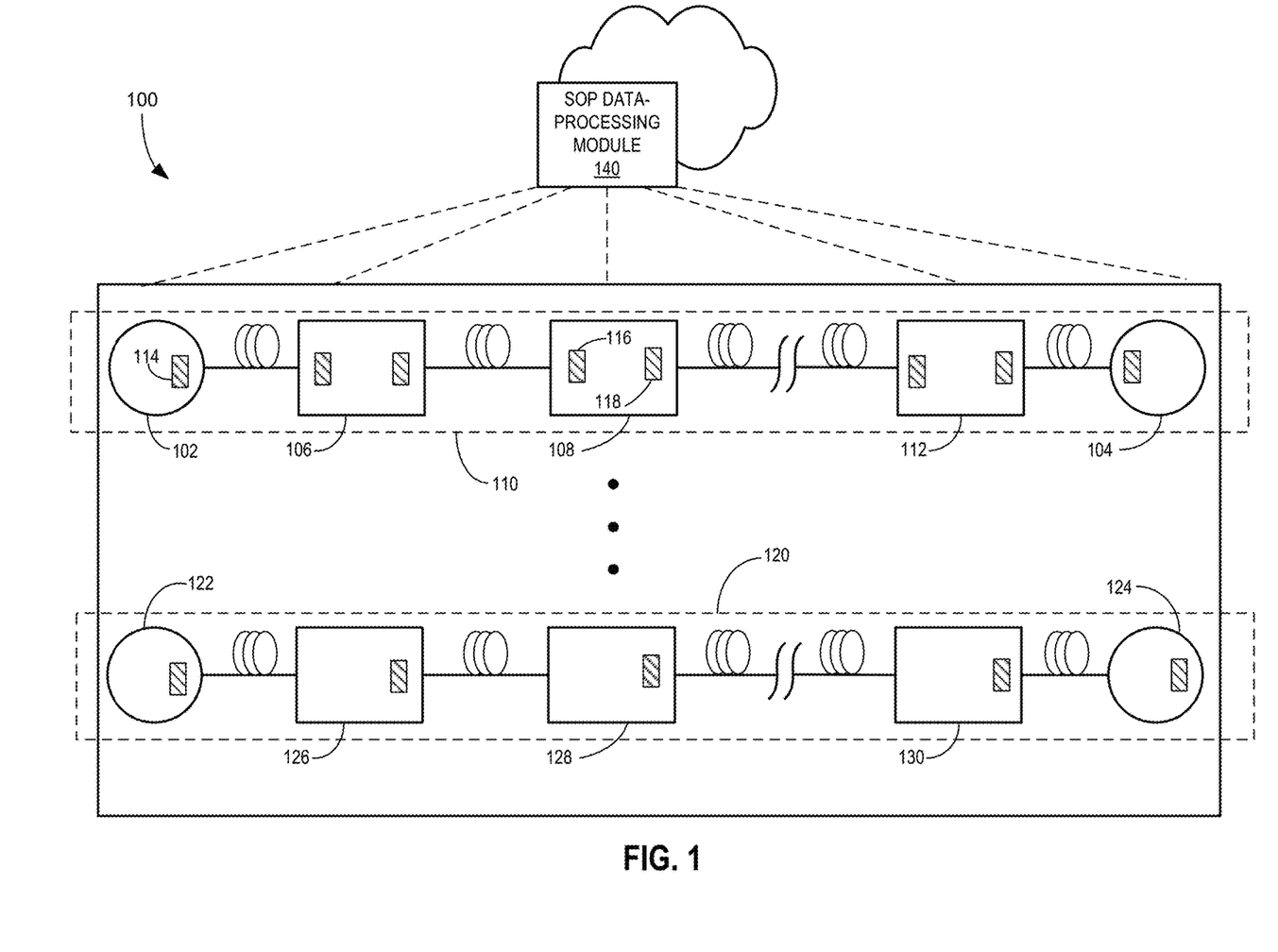
FIG. 1 presents a diagram illustrating an exemplary fiber-sensing network, according to one embodiment.

FIG. 1 presents a diagram illustrating an exemplary fiber-sensing network, according to one embodiment. In FIG. 1, the topology of fiber-sensing network 100 can be similar to an OTN and can include a number of fiber paths (e.g., fiber paths 110 and 120). Each fiber path can include a number of network elements (NEs), including both terminal NEs and inline NEs, and fiber spans connecting the NEs. In the example shown in FIG. 1, fiber path 110 can include terminal NEs 102 and 104; inline NEs 106, 108, and 112; and fibers connecting adjacent NEs. Fiber path 120 can include terminal NEs 122 and 124; inline NEs 126, 128, and 130; and fibers connecting the NEs. Terminal NEs can include electrical layer devices, such as optical transceivers, and the inline NEs can include inline optical amplifiers (e.g., EDFAs). The typical distance of a fiber span (e.g., the distance between adjacent amplifier sites) can be about 80 kilometers for standard singlemode fiber.

Unlike a conventional OTN, in some embodiments, each NE in fiber-sensing network 100 can include at least one OSC-polarization monitor for monitoring the SOP of OSC signals in the adjacent fiber span or spans. For example, terminal NE 102 can include OSC-polarization monitor 114 and inline NE 108 can include OSC-polarization monitors 116 and 118. Each OSC-polarization monitor can measure or monitor the SOP of the OSC signals received from an adjacent fiber span.

Fiber-sensing network 100 can also include an SOP-data-processing module 140, which is coupled to each OSC-polarization monitor and can be configured to process SOP data received from each OSC-polarization monitor. The processed SOP data can provide information associated with environmental factors around each fiber span. In some embodiments, SOP-data-processing module 140 can be part of the network control-and-management platform of the OTN. SOP-data-processing module 140 can use various digital-signal-processing techniques (e.g., digital filtering) to process the raw polarization data received from the NEs.

Different mechanisms can be used to obtain information associated with the polarization of optical signals. In some embodiments, a polarimeter can be used to measure the SOP of the OSC signal. In alternative embodiments, a simpler device that includes a linear polarizer and a photodetector (PD) can be used to detect changes (e.g., as a function of time) in the polarization of the OSC signals. As the polarization of the OSC signal rotates, the amount of light that can pass through the linear polarizer changes. Therefore, the amount of changes in polarization can be measured by measuring the power of the light passing through the linear polarization using the PD (which can be a photodiode). Such a device can further include an analog-to-digital-converter (ADC) that converts the analog output of the PD to digital signals.

Figure 2A:
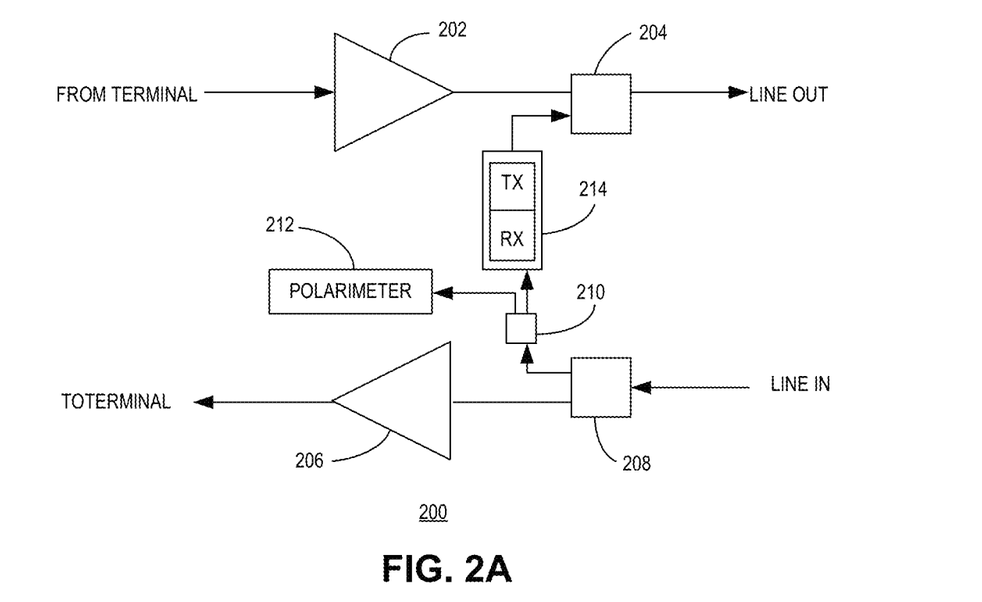
FIG. 2A illustrates an exemplary solution for obtaining polarization information at a terminal NE, according to one embodiment.

FIG. 2A illustrates an exemplary solution for obtaining polarization information at a terminal NE, according to one embodiment. Terminal NE 200 can include two optical paths, the receiving path (i.e., from the network to the terminal) and the transmitting path (i.e., from the terminal to the network). FIG. 2A shows that the transmitting path can include an amplifier (e.g., a boost amplifier 202) and a wavelength coupler 204. Similarly, the receiving path can include an amplifier (e.g., a preamplifier 206) and a wavelength coupler 208. When optical signals from the network arrive at terminal NE 200, wavelength coupler 208 can separate the data-carrying optical signal and the OSC signal. The data-carrying optical signal can be sent to amplifier 206 for amplification, whereas the OSC signal is sent to another optical coupler (e.g., a 3 dB coupler or a coupler of a different ratio) such that a portion of the OSC signal is sent to polarimeter 212. Polarimeter 212 is capable of measuring the SOP of the received optical signal, and the SOP can be in a digital format and can include the Stokes parameters (e.g., $S_0$, $S_1$, $S_2$, $S_3$). The other portion of the OSC can be sent to an OSC module 214, which can perform the various OSC functions, such as monitoring the behavior of the local amplifiers and the behavior (e.g., loss, dispersion, etc.) of the data-carrying optical signals (e.g., wavelength-division multiplexing (WDM) signals). OSC module 214 can include a receiver (RX) and a transmitter (TX) as shown in FIG. 2A. Other functional blocks (e.g., a data-processing module) are not shown in FIG. 2A. In a typical NE, OSC module 214 can be a line card. FIG. 2A shows that polarimeter 212 and coupler 210 are outside of OSC module 214. In one embodiment, polarimeter 212 and coupler 210 can both reside on the OSC line card.

In addition to receiving OSC signals from an upstream fiber span in one direction, NE 200 can also transmit OSC signals to a downstream fiber span in another direction. In FIG. 2A, the transmitter output of OSC module 214 can be coupled, via wavelength coupler 204, with the data-carrying optical signal that has been amplified by boost amplifier 206 such that the OSC output can be transmitted to the next NE along the optical path.

At terminal NE 200, the output of polarimeter 212, which includes the polarization information (e.g., SOP) of the adjacent fiber span, can be sent to the network control-and-management platform for processing by terminal NE 200. In some embodiments, each NE in the OTN can be assigned a unique identifier, and the polarization information obtained at a particular NE can be labeled using the particular identifier of that NE. In the example shown in FIG. 2A, the measurement output of polarimeter 212 can be labeled using the identifier of terminal NE 200 such that when such polarization information is received at the network control-and-management platform, it can be mapped to an NE and hence a physical location within the OTN. The OSC communications between each NE and the network control-and-management module are standard operations in a WDM network and will not be discussed in detail here.

Figure 2B:
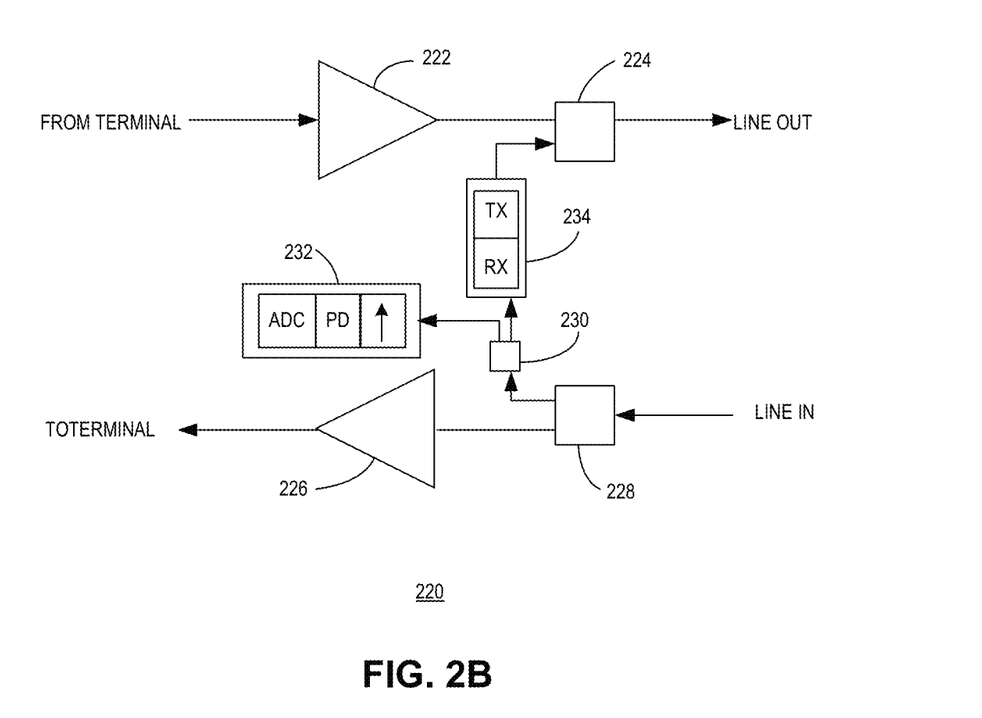
FIG. 2B illustrates an exemplary solution for obtaining polarization information at a terminal NE, according to one embodiment.

In addition to a polarimeter, the combination of a linear polarizer and a PD can also be used to obtain polarization information. FIG. 2B illustrates an exemplary solution for obtaining polarization information at a terminal NE, according to one embodiment. Like terminal NE 200, terminal NE 220 can include a transmitting path and a receiving path. The transmitting path can include a boost amplifier 222 and a wavelength coupler 224, and the receiving path can include a preamplifier 226 and a wavelength coupler 228. Wavelength coupler 228 separates the data-carrying signal and the OSC signal included in the received optical signals, and the data-carrying signal is sent to preamplifier 226 for amplification. A portion of the OSC signal can be tapped out via a coupler 230 and sent to polarization-change detector 232. Polarization-change detector 232 can include a linear polarizer, a PD, and an ADC. The direction of the linear polarizer can be set to a predetermined direction and the PD measures the power of the tapped OSC signal after it passes through the linear polarizer. The measured optical power indicates the amount of polarization change. For example, if the polarization changes over time, the measured optical power will change over time accordingly. A sudden change in polarization can indicate a sudden mechanical disturbance (e.g., an earthquake). The ADC can convert the analog output of the PD to digital signals that indicated the SOP changes of the received OSC signal. Such digital signals can then be forwarded by NE 220 to the network control-and-management platform for processing to obtain polarization information of the OSC signal when it traverses a fiber span adjacent to NE 220. Such polarization information can then be used to determine environmental factors (e.g., vibrations and temperature changes) surrounding the fiber span. As discussed previously, OSC module 234 not only receives (via its receiver) an OSC signal from an adjacent NE but also generates and transmits (via its transmitter) an OSC signal (which can include management information received at NE 220) to the adjacent NE.

Figure 3A:
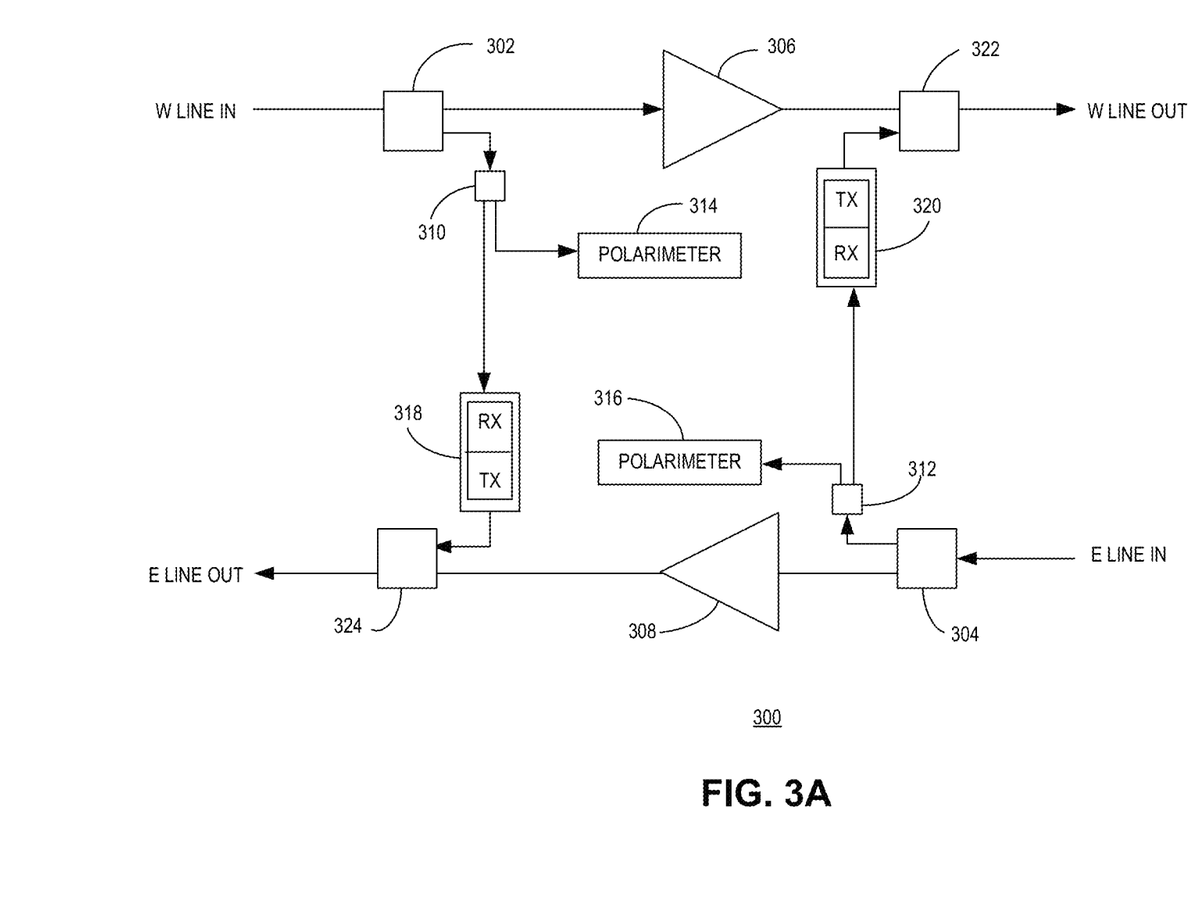
FIG. 3A illustrates an exemplary solution for obtaining polarization information at an inline NE, according to one embodiment.

Unlike terminal NEs 200 and 220 shown in FIGS. 2A-2B, an inline NE can receive OSC signals from two directions, meaning that the inline NE can monitor polarizations to two OSC signals. To do so, the inline NE needs to include at least two OSC-polarization monitors. FIG. 3A illustrates an exemplary solution for obtaining polarization information at an inline NE, according to one embodiment. Inline NE 300 can include two signal paths, the west (W) path and the east (E) path. Each path includes a WDM coupler (e.g., coupler 302 or 304) for separating the received data-carrying signal and the OSC signal. The data-carrying signal is sent to an inline amplifier (e.g., amplifier 306 or 308) for amplification. A portion of the OSC signal can be tapped by a coupler (e.g., coupler 310 or 312) for polarization measurement. The coupler can be a 3 dB coupler or a coupler having a different power-splitting ratio. In the example shown in FIG. 3A, a polarimeter (e.g., polarimeter 314 or 316) is used to measure the SOP of the tapped OSC signal. The remaining portion of the OSC signal can be sent to an OSC module (e.g., OSC module 318 or 320) for processing. OSC modules 318 and 320 each include at least a receiver for receiving the OSC signal from a previous or upstream NE and a transmitter for transmitting a locally generated OSC signal to the next or downstream NE. OSC module 318 and 320 each can also include a signal processor for processing the received OSC signal.

When the inline NEs are coupled to the network control-and-management platform via a separate data communication network (DCN), output of the polarimeters (which include SOP information of adjacent fiber spans) can be sent to the network control-and-management platform via the DCN (e.g., via a separate transmitter on the NE). However, at certain remote sites (e.g., amplifier sites along the subsea cable), the DCN is not available, and the output of the polarimeters in inline NEs can be relayed to a terminal NE span-by-span along with the OSC signals locally generated at each span. Each inline NE can include (e.g., by appending) the SOP of the received OSC signal in the locally generated OSC signal to be transmitted downstream. For example, NE 300 can include SOP measurement provided by polarimeter 314 in OSC signal transmitted downstream by the transmitter of OSC module 320. Such SOP information can be used to infer environmental factors (e.g., mechanical disturbances or temperature) in the environment surrounding the fiber span upstream to NE 300. The SOP information can be relayed span-by-span until it reached an NE. Similarly, NE 300 can include SOP measurement provided by polarimeter 316 in OSC signal transmitted downstream by the transmitter of OSC module 318. Note that, depending on the direction of the signal path, either fiber span coupled to NE 300 can be in its upstream direction. The SOP information can be labeled to identify not only at which NE it is measured but also for which fiber span. The transmitter output of an OSC module can be combined with the amplified outgoing data-carrying signal by a WDM coupler (e.g., WDM coupler 322 or 324) and the combined signals can be sent to the downstream NE.

Figure 3B:
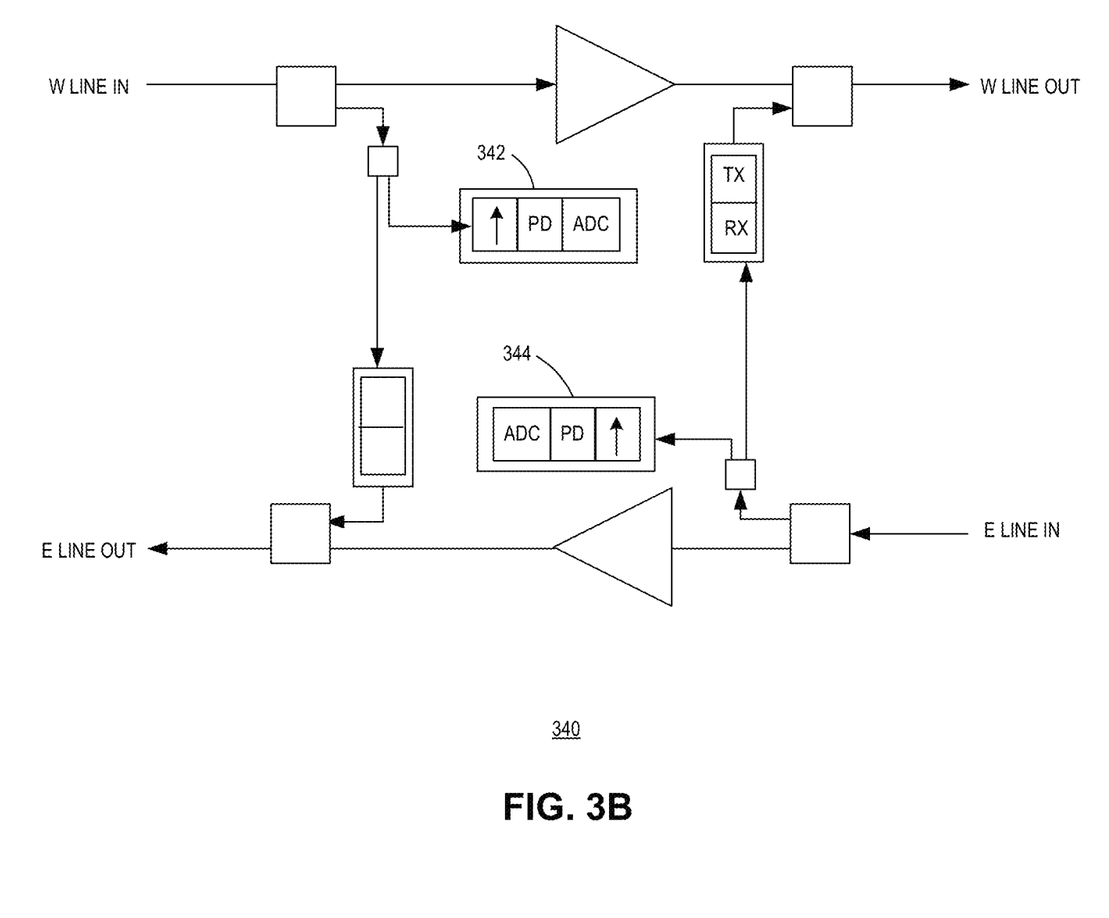
FIG. 3B illustrates an exemplary solution for obtaining polarization information at an inline NE, according to one embodiment.

FIG. 3B illustrates an exemplary solution for obtaining polarization information at an inline NE, according to one embodiment. Inline NE 340 can be very similar to inline NE 300 shown in FIG. 3A, except that the OSC-polarization monitoring functions are now accomplished by the polarizer and PD combination not by a polarimeter. In fact, in the example shown in FIG. 3B, polarization-change detectors 342 and 344 replace polarimeters 314 and 316 shown in FIG. 3A, respectively. As discussed previously, each polarization-change detector includes a linear polarizer followed by a PD to detect the amount of polarization change, and each polarization-change detector can further include an ADC to convert the analog output of the PD to digital signals to be sent to the network control-and-management platform. The remaining components in NE 340 can be similar to NE 300 and accomplish similar functions, such as separating the OSC signal from the data-carrying signal, amplifying the data-carrying signal, processing the OSC signals, etc.

Figure 4:
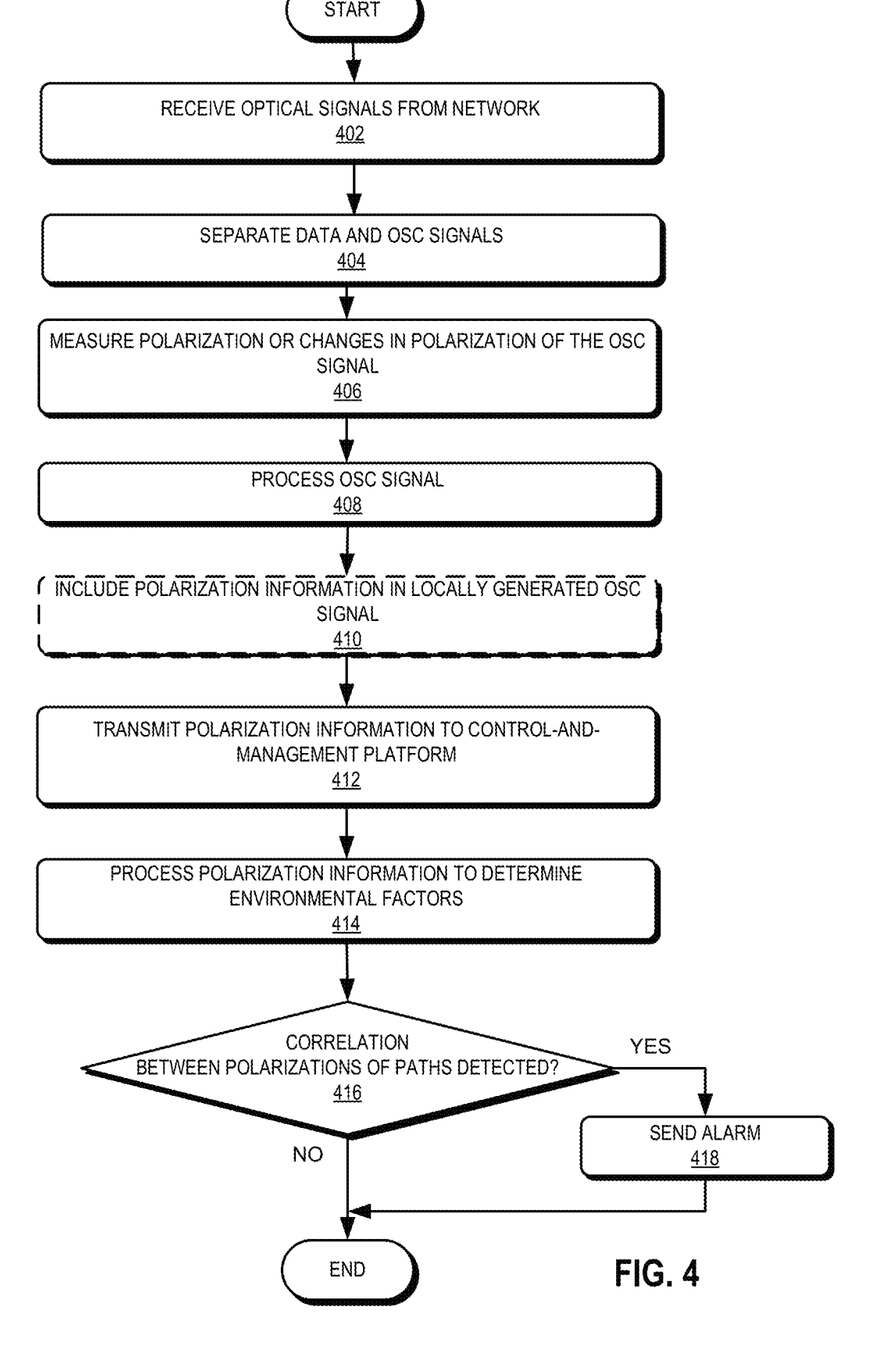
FIG. 4 presents a flowchart illustrating an exemplary SOP-based fiber-sensing process, according to one embodiment.

FIG. 4 presents a flowchart illustrating an exemplary SOP-based fiber-sensing process, according to one embodiment. During operation, an NE (which can be a terminal NE or an inline NE) receives optical signals from the network via an adjacent fiber span (operation 402). The received optical signals can include both the data-carrying client signals (which can be WDM signals in the C-band or L-band) and an OSC signal (which can have a wavelength of 1510 or 1620 nm). The data and OSC signals can then be separated, e.g., by a WDM coupler (operation 404). Separating these two signals allows the OSC signal to be separately processed by an OSC module within the NE.

The absolute SOP or changes in the polarization of the OSC signal can be measured (operation 406). To measure the SOP, the received OSC signal can be tapped and the tapped portion can be sent to a polarimeter module. Such a module can be a standalone unit or a functional block on the OSC line card. The remaining portion of the OSC signal can be processed to extract useful control-and-management information, such as software updates (operation 408). In situations where DCN is not available at an inline NE, the system can optionally include the obtained polarization information in locally generated OSC signals to be transmitted downstream (operation 410). The polarization information can then be transmitted to the network control-and-management platform (operation 412). When DCN is available, an inline NE can send (e.g., by a separate transmitter) the polarization to the network control-management platform via the DCN. When the polarization information is included in the locally generated OSC signals, it can be relayed span-by-span from one end of an optical path (e.g., a terminal NE) to the other end of the optical path (e.g., another terminal NE) before being converted to an in-band signal and sent to the network control-and-management platform.

The polarization information included in the OSC message can be processed at the network control-and-management platform (operation 414). In some embodiments, the network control-and-management platform can include an SOP-data-processing module particularly designed to process the polarization data, which can be the absolute SOP or changes in the SOP for each fiber span in the network. From the examples shown in FIGS. 3A and 3B, one can see that both directions of a fiber span are being monitored. The system subsequently determines environment factors surrounding each fiber span based on the processed polarization information (operation 416). For example, slow polarization changes can indicate a change in temperature, whereas a sudden change in the SOP can be the result of a large amount of stress (e.g., that caused by an earthquake).

In addition to detecting environmental factors, monitoring the SOP of the OSC signal at each fiber span can also provide important information that can be used to ensure proper protection in the network. An optical network typically employs some type of protection scheme such that failures (e.g., a fiber cut) in the network do not lead to service loss. One protection scheme uses dedicated backup fibers. To provide protection, it is desirable that the primary fiber and the backup do not share the same route so that failure in one fiber does not affect the other fiber. However, in a complex network where fiber links can be reconnected or reconfigured, it is possible that at certain spans the primary fiber and the backup fiber may share the same route. Such a situation can lead to major traffic loss if failure occurs on that route. Timely detecting and correcting the route overlapping between the primary and backup fibers can be important. In some embodiments, subsequent to processing the polarization information, the system can compare the detected SOP changes on the primary fiber to the SOP changes on the backup fiber to determine if a correlation (more particularly, a spatial correlation) between the SOP changes can be detected (operation 416). For example, the system can determine if the spatial correlation between SOP changes of the two fibers is greater than a predetermined threshold. If so, it indicates that there exists a possibility that at least a portion (e.g., a single fiber span or multiple fiber spans) of the two fibers share a route. The system can then send an alarm (operation 418), prompting the network operator to investigate.

Figure 5:
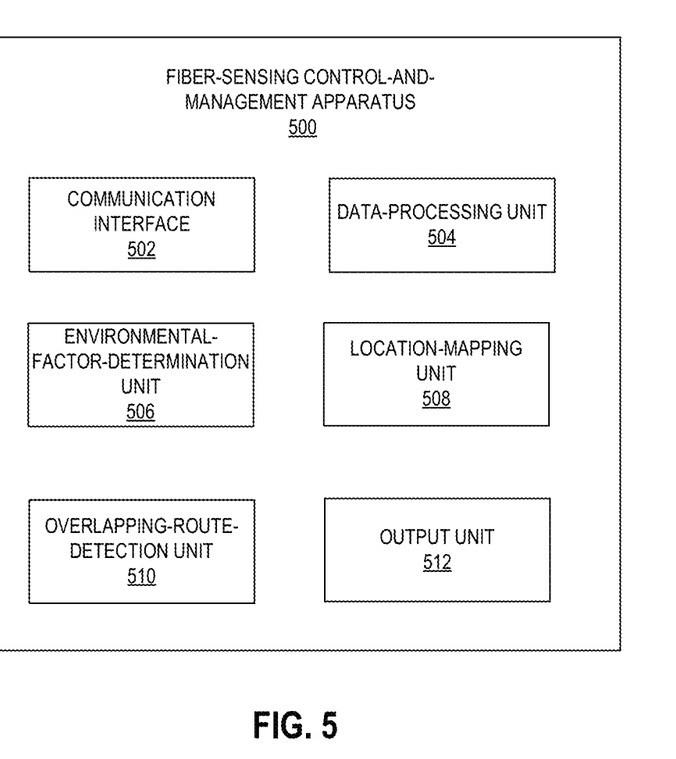
FIG. 5 illustrates an exemplary apparatus for implementing SOP-based fiber sensing, according to one embodiment.

FIG. 5 illustrates an exemplary apparatus for implementing SOP-based fiber sensing, according to one embodiment. Fiber-sensing control-and-management apparatus 500 can include a communication interface 502, a data-processing unit 504, an environmental-factor-determination unit 506, a location-mapping unit 508, an overlapping-route-detection unit 510, and an output unit 512.

Communication interface 502 facilitates the OSC communication between fiber-sensing control-and-management apparatus 500 and the OSC module or modules on each NE. Various standard communication protocols (e.g., Ethernet) may be used.

Data-processing unit 504 can process the received polarization information associated with the OSC signals received at each NE. Various digital signal processing (DSP) techniques can be used, including but not limited to: time-domain analysis, frequency-domain analysis, etc.

Environmental-factor-determination unit 506 can determine environmental factors surrounding a fiber span based on the polarization information associated with the OSC signal travelling on the fiber span. Certain machine-learning models can be applied. Such models can be trained using past measurements with known environmental factors. For example, an earthquake-detection model can be trained using past SOP measurements of fibers and seismic activity data of locations close to those fibers. Similarly, a traffic-detection model can be trained using past SOP measurements of fibers and traffic data at the fiber locations. A temperature-detection model can also be developed using a similar technique. Location-mapping unit 508 can map the determined environmental factors to a geographic location. In some embodiments, this mapping can be determined based on the identifier of the NE providing the polarization information and data stored in a fiber-inventory table indicating the geographic location of the NE.

Overlapping-route-detection unit 510 can facilitate the detection of route overlapping between a primary fiber and a backup fiber. More specifically, overlapping-route-detection unit 510 can detect any correlation in changes of the SOP between a primary fiber and a backup fiber. Such correlation often indicates a possibility of route overlapping.

Output unit 512 can output the determined environmental factors for specific geographic locations as well as possible alarms. For example, if an earthquake is detected at a particular fiber span, output unit 512 can output an earthquake alarm. Similarly, if overlapping of route between a primary fiber and a backup fiber is detected, output unit 512 can output a route-overlapping alarm.

Figure 6:
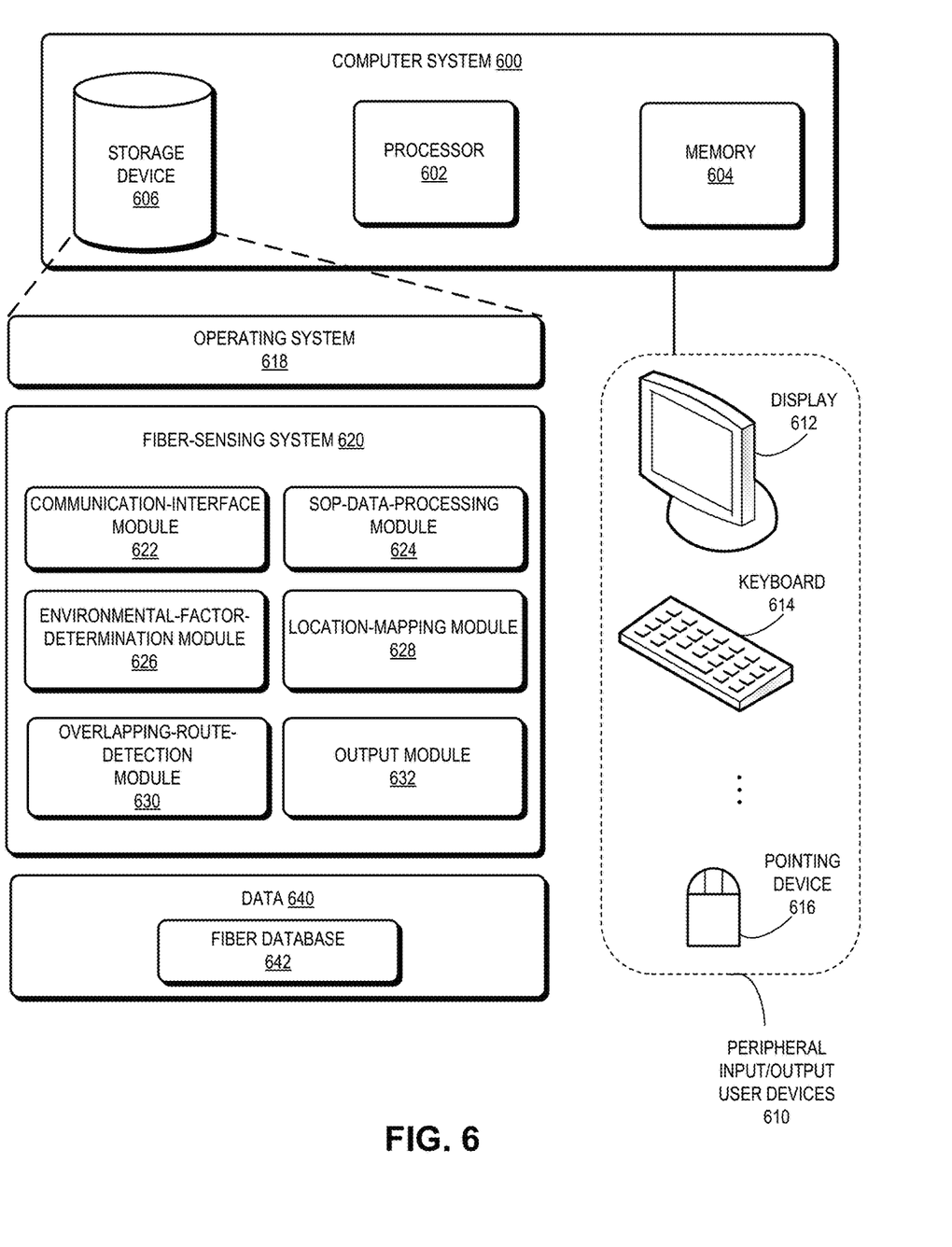
FIG. 6 illustrates an exemplary computer system that facilitates SOP-based fiber sensing, according to one embodiment.

FIG. 6 illustrates an exemplary computer system, according to one embodiment. Computer system 600 includes a processor 602, a memory 604, and a storage device 606. Furthermore, computer system 600 can be coupled to peripheral input/output (I/O) user devices 610, e.g., a display device 612, a keyboard 614, and a pointing device 616. Storage device 606 can store an operating system 618, a fiber-sensing system 620, and data 640.

Fiber-sensing system 620 can include instructions, which when executed by computer system 600, can cause computer system 600 or processor 602 to perform methods and/or processes described in this disclosure. Specifically, fiber-sensing system 620 can include instructions for operating a communication interface (communication-interface module 622), instructions for processing polarization data (SOP-data-processing module 624), instructions for determining environmental factors based on the processed polarization data (environmental-factor-determination module 626), instructions for mapping the determined environmental factors to geographic locations (location-mapping module 628), instructions for detecting possible route overlapping between a primary fiber and a backup fiber (overlapping-route-detection module 630), and instructions for generating an output (output module 632). Data 640 can include a fiber database 642.

In general, the system provides a solution for distributed fiber sensing with enhanced spatial resolution. The system uses the existing wide-spread data-communication optical networks as distributed fiber-sensing networks, eliminating the need to lay out additional fibers, thus lowering the cost. Moreover, the system leverages OSC signals that are already part of the data communication in the optical network, eliminating the need to inject additional test optical signals into the fibers, thus reducing the energy consumption. Because the OSC signals are terminated at each NE, an OSC signal in one fiber span is independent of an OSC signal in another fiber span. Such signal independence ensures that the spatial resolution of the fiber sensing can at least be the length of the fiber span. The polarization information can be obtained using reliable, low-cost components, such as polarimeters or linear polarizer-PD combos. Moreover, the polarization information obtained at each NE can be part of the OSC communication to the network control-and-management platform, incurring minimum communication overhead.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, the methods and processes described above can be included in hardware modules or apparatus. The hardware modules or apparatus can include, but are not limited to, application-specific integrated circuit (ASIC) chips, field-programmable gate arrays (FPGAs), dedicated or shared processors that execute a particular software module or a piece of code at a particular time, and other programmable-logic devices now known or later developed. When the hardware modules or apparatus are activated, they perform the methods and processes included within them.

The foregoing descriptions of embodiments have been presented for purposes of illustration and description only. They are not intended to be exhaustive or to limit the scope of this disclosure to the forms disclosed. Accordingly, many modifications and variations will be apparent to practitioners skilled in the art.

What is claimed is:

1. A network element (NE), comprising:
a first wavelength coupler configured to separate a first optical supervisory channel (OSC) signal from a data-carrying signal received from a fiber span;
a polarization-measurement unit having an input coupled to an output of the first wavelength coupler, wherein the polarization-measurement unit is configured to perform a polarization measurement on the first OSC signal to obtain a state of polarization of the first OSC signal; and
an OSC unit comprising a receiver and a transmitter, wherein the receiver is configured to receive the first OSC signal and the transmitter is configured to transmit a second OSC signal that includes the state of polarization of the first OSC signal to a control-and-management unit, thereby facilitating distributed fiber sensing.

2. The NE of claim 1, wherein the polarization-measurement unit comprises a polarimeter.

3. The NE of claim 1, wherein the polarization measurement comprises a measurement of changes in the state of polarization of the first OSC signal, and wherein the polarization-measurement unit comprises a linear polarizer followed by a photodetector.

4. The NE of claim 1, further comprising:
a second wavelength coupler configured to combine the second OSC signal and an outgoing data-carrying signal such that the second OSC signal is transmitted to a next NE in an optical transport network (OTN).

5. The NE of claim 1, wherein the NE is an inline NE coupled to two fiber spans, and wherein the inline NE comprises two polarization-measurement units, with each polarization-measurement unit configured to perform a polarization measurement on an OSC signal received from a particular fiber span.

6. A system for distributed fiber sensing, comprising:
a plurality of network elements (NEs) in an optical transport network (OTN) and a control-and-management unit coupled to the NEs;
wherein a respective network element (NE) comprises:
a first wavelength coupler configured to separate a first optical supervisory channel (OSC) signal from a data-carrying signal received from a fiber span;
a polarization-measurement unit having an input coupled to an output of the first wavelength coupler, wherein the polarization-measurement unit is configured to perform a polarization measurement on the first OSC signal to obtain a state of polarization of the first OSC signal; and
an OSC unit comprising a receiver and a transmitter, wherein the receiver is configured to receive the first OSC signal and the transmitter is configured to transmit a second OSC signal that includes the state of polarization of the first OSC signal to the control-and-management unit, thereby facilitating distributed fiber sensing.

7. The system of claim 6, wherein the polarization-measurement unit comprises a polarimeter.

8. The system of claim 6, wherein the polarization measurement comprises a measurement of changes in the state of polarization of the first OSC signal, and wherein the polarization-measurement unit comprises a linear polarizer followed by a photodetector.

9. The system of claim 6, wherein the NE further comprises:
a second wavelength coupler configured to combine the second OSC signal and an outgoing data-carrying signal such that the second OSC signal is transmitted to a next NE in the OTN.

10. The system of claim 6, wherein the respective NE is an inline NE, wherein the inline NE is coupled to two fiber spans, and wherein the inline NE comprises two polarization-measurement units, with each polarization-measurement unit configured to perform a polarization measurement on an OSC signal received from a particular fiber span.

11. The system of claim 6, wherein the control-and-management unit comprises a polarization-data-processing unit configured to process data associated with the state of polarization of the first OSC signal.

12. The system of claim 11, wherein the control-and-management unit comprises an environmental-factor-determination unit configured to determine environmental factors surrounding the fiber span based on the processed outcome data.

13. The system of claim 12, wherein the environmental factors comprise one or more of: mechanical disturbance and temperature changes.

14. The system of claim 13, wherein the control-and-management unit comprises an overlapping-route-determination unit configured to determine whether the fiber span shares a route with a corresponding backup fiber.

15. A method for distributed fiber sensing, comprising:
receiving, at a network element (NE), optical signals from a fiber span coupled to the NE;
separating a first optical supervisory channel (OSC) signal from a data-carrying signal in the received optical signals;
performing a polarization measurement on the first OSC signal to obtain a state of polarization of the first OSC signal;
generating a second OSC signal that includes the state of polarization of the first OSC signal; and
transmitting the second OSC signal to a control-and-management unit; and
determining environmental factors surrounding the fiber span based on the state of polarization of the first OSC signal.

16. The method of claim 15, wherein performing the polarization measurement comprises one of:
using a polarimeter to measure the state of polarization of the first OSC signal; and using a linear polarizer followed by a photodetector to measure changes in the state of polarization of the first OSC signal.

17. The method of claim 15, further comprising:
combining the second OSC signal and an outgoing data-carrying signal such that the second OSC signal is transmitted to a next NE.

18. The method of claim 15, further comprising:
processing, by a polarization-data-processing unit, data associated with the state of polarization of the first OSC signal.

19. The method of claim 18, further comprising determining whether the fiber span shares a route with a corresponding backup fiber.

\* \* \* \* \*